US010458445B2

(12) United States Patent
Bauer

(10) Patent No.: US 10,458,445 B2
(45) Date of Patent: Oct. 29, 2019

(54) DEVICE FOR RELIEVING PRESSURE IN HYDRAULICS LINES

(71) Applicant: HYDAC TECHNOLOGY GMBH, Sulzbach/Saar (DE)

(72) Inventor: Frank Bauer, Marpingen (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 209 days.

(21) Appl. No.: 15/329,283

(22) PCT Filed: Aug. 26, 2015

(86) PCT No.: PCT/EP2015/001738
§ 371 (c)(1),
(2) Date: Jan. 26, 2017

(87) PCT Pub. No.: WO2016/037689
PCT Pub. Date: Mar. 17, 2016

(65) Prior Publication Data

US 2017/0227027 A1 Aug. 10, 2017

(30) Foreign Application Priority Data

Sep. 9, 2014 (DE) ........................ 10 2014 013 495

(51) Int. Cl.
*F15B 20/00* (2006.01)
*E02F 3/36* (2006.01)
(Continued)

(52) U.S. Cl.
CPC .......... *F15B 20/007* (2013.01); *E02F 3/3654* (2013.01); *E02F 9/226* (2013.01);
(Continued)

(58) Field of Classification Search
CPC ..................................................... F15B 20/007
(Continued)

(56) References Cited

U.S. PATENT DOCUMENTS 2,205,632 A * 6/1940 Schwarz ................. C13B 10/06
100/170
2,888,231 A * 5/1959 Wellesley ............. E21D 15/587
248/636
(Continued)

FOREIGN PATENT DOCUMENTS

DE 255 499 4/1988
DE 20 2008 002 686 6/2008
(Continued)

OTHER PUBLICATIONS

International Search Report (ISR) dated Nov. 12, 2015 in International (PCT) Application No. PCT/EP2015/001738.

*Primary Examiner* — Craig M Schneider
*Assistant Examiner* — David R Deal
(74) *Attorney, Agent, or Firm* — Wenderoth, Lind & Ponack, L.L.P.

(57) ABSTRACT

A device for relieving pressure in hydraulic lines, in particular in connecting lines that have coupling points (6, 8), are located between attachments and include hydraulically actuated actuators and working implements supplying the attachments. A control block (2) is connected to the line to be relieved and includes an openable non-return valve (12) as a relief valve. A pressure accumulator (22) holds a relieving volume when the non-return valve is open. An actuating member (38) can be moved manually to open the non-return valve (12) and is arranged to be movable on the housing (24) of the pressure accumulator (22).

21 Claims, 2 Drawing Sheets

(51) Int. Cl.
*E02F 9/22* (2006.01)
*F15B 13/02* (2006.01)

(52) U.S. Cl.
CPC .......... *E02F 9/2275* (2013.01); *F15B 13/027* (2013.01); *F15B 2201/30* (2013.01); *F15B 2201/31* (2013.01); *F15B 2201/411* (2013.01)

(58) Field of Classification Search
USPC .............................................. 138/31; 137/522
See application file for complete search history.

(56) References Cited

U.S. PATENT DOCUMENTS 3,064,687 A * 11/1962 Natho ........................ F15B 1/04 137/508
3,393,509 A * 7/1968 Kempson ................ F16H 39/00 60/413
3,425,574 A * 2/1969 Learmont ................. E02F 3/30 414/690
4,076,036 A * 2/1978 Taft ........................ B60T 13/141 137/118.06
4,950,126 A * 8/1990 Fabiano ................ B66F 11/048 248/184.1
5,306,122 A * 4/1994 Gebauer ............... F04B 43/067 137/522
7,448,406 B1 * 11/2008 Waite ...................... F16K 15/18 137/322
7,766,597 B2 * 8/2010 Tanaka ...................... E02F 3/34 280/783
8,561,637 B2 * 10/2013 Petrarca ................. B65D 90/34 137/493.4
2003/0213519 A1 * 11/2003 Griffin ...................... F16K 1/04 137/240
2005/0247359 A1 11/2005 Hiser
2007/0157971 A1 * 7/2007 Kussel .................. F16K 15/186 137/522

FOREIGN PATENT DOCUMENTS

DE 10 2009 050 833 4/2011
DE 10 2012 012 843 12/2013

* cited by examiner

DEVICE FOR RELIEVING PRESSURE IN HYDRAULICS LINES

FIELD OF THE INVENTION

The invention relates to a device for relieving pressure in hydraulic lines, in particular in connecting lines that have coupling points and that are located between attachments having hydraulically actuatable actuators and working implements supplying the attachments.

BACKGROUND OF THE INVENTION

Very diverse working implements, such as those used in the construction industry or in agriculture or forestry generally, have a hydraulic system for supplying various consumers, such as working cylinders, drive trains, steering or braking systems. Attachments can also be supplied with hydraulic power from the hydraulic system via connecting lines, such as hoses and coupling points. Those attachments can be mounted on the corresponding working implement as working tools for various activities and can be detached when not in use. Such attachments, for instance shovels, clamshells, or the like, usually have working cylinders as actuators, which actuate working movements by supplying pressure medium from the system of the associated working implement.

With the system in the unpressurized state, the corresponding attachment can be easily and safely disconnected and parked, while not in use, by separating couplers. Under the influence of heat on the disconnected and parked attachment, for example due to solar irradiation at the storage site, the pressure of the hydraulic fluid in the system of the parked attachment increases considerably. Temperature increases of a few degrees Kelvin are enough to cause the pressure to rise to more than 100 bar. At such a pressure level, connecting the standard self-closing couplers for putting the parked attachment back into service becomes nearly impossible and involves a high risk of injury. In order to be able to connect lines, one is then compelled to loosen a screw connection, which loosening not only means inconvenient extra effort, but also results in a hydraulic fluid discharge. Plus, there is a possibility of dirt contaminating the system due to an unscrewed coupling.

BACKGROUND OF THE INVENTION

With regard to these problems, the invention addresses the problem of providing an easily operated and compact device that enables a safe pressure relief of a corresponding hydraulic line.

According to the invention, this problem is basically solved by a device that has, in a control block to which the line to be relieved is connected, a relief valve in the form of an openable non-return valve. Via the non-return valve, a relief volume that reduces the line pressure can be fed into a pressure accumulator. The non-return valve can be opened by a manually moveable actuating member that is arranged so as to be moveable on the housing of the pressure accumulator. Before coupling a parked attachment to put it into service, any system pressure that may have built up in the attachment can then be easily and safely lowered to a pressure value at which the coupling process for connection to the working implement can be carried out easily and safely. The pressure relief according to the invention not only helps in relieving pressure due to a rise in temperature, but also in general because oil volume in the initially still closed system must be displaced during coupling. Furthermore, the force always acts in exactly the right moment (not too soon and not too late), namely when the counterforce is generated by the coupling. Due to the fact that the manually moveable actuating member for triggering the pressure relief is inventively arranged so as to be moveable on the housing of the pressure accumulator and that the pressure accumulator is a component of the actuating mechanism, the device can be particularly simple and compact in configuration and economically produced.

In a particularly advantageous manner, the housing of the accumulator and the control block can be combined into one structure, in which a direct connection of the fluid chamber of the pressure accumulator to the relief outlet of the non-return valve is formed. With such a construction, a minimum amount of installation space is necessary for the device. The entire device, including the pressure accumulator, can then be easily mounted directly on the attachment or inserted in a hose line running between the attachment and the working machine.

In particularly advantageous exemplary embodiments, provision is made of a pressure accumulator with a housing that extends along a longitudinal axis. The actuating member, in the form of an actuator rod, is guided coaxially through the housing to the closing body of the non-return valve. The closing body can be moved against a closing force into the open position by the actuator rod. Due to the fact that the actuating mechanism is integrated in the pressure accumulator in this fashion, the device can be configured with minimum overall dimensions. The control block is preferably designed such that actuating direction of the non-return valve always coincides with the actuating direction of the coupling, which allows easy manipulation, preferably one-handed operation.

In a particularly advantageous manner, provision is made of a pressure accumulator in the form of a spring accumulator, which has an axially moveable accumulator piston that is spring-tensioned, on its side facing away from the fluid chamber, by a compression spring and through which the coaxial actuator rod passes. The actuator rod extends by its inside end through the fluid inlet of the housing to the closing body of the non-return valve. The pressure accumulator can also be embodied as a spring accumulator in a cost-effective and compact manner. The relief system can also be embodied as a gas accumulator, which in certain circumstances leads to stringent requirements in terms of gas tightness.

For easy and convenient actuation, an actuator button for sliding the actuator rod manually can be mounted on the outside end of the actuator rod that projects above the external end of the housing of the accumulator.

For a particularly convenient manipulation of the device, the structure formed from the accumulator block and the accumulator housing can form a handle adjacent to the actuation axis formed by the housing. For carrying out a coupling process, the handle on the control block can be gripped with one hand and the actuator button can be simultaneously pressed with a finger of the same hand so that the operator's other hand is free to carry out the coupling process, for example by plugging in a plug-in coupling.

In particularly advantageous exemplary embodiments, the handle can form a connection part between a first coupling part having a line coupler and extending overhangingly along the actuation axis next to the accumulator housing. A second line coupler can be positioned on the actuation axis. The connection part extends in curved form between the coupling part and the second line coupler. Thus designed, the structure forms a comfortable and secure handle for the operator. Because the second line coupler lies on the actuation axis, the actuation direction for opening the non-return valve and the actuation direction for forming a plug-in connection to the second line coupler, for example, coincide so as to give rise to a favorable force direction for actuating the device.

In a preferred construction of the spring accumulator, the housing thereof is closed, on the end turned away from the fluid chamber, by a closing body against which the compression spring, in the form of a helical spring applying spring tension to the accumulator piston, abuts. The closing body has a tubular extension that extends axially inside the compression spring and in which the actuator rod passing through the closing part is guided so as to be axially moveable. With its extension, the housing end part thus forms the guideway for the actuator rod as well as an internal guide core for the helical spring surrounding the extension.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAIL DESCRIPTION OF THE INVENTION

Figure 1:
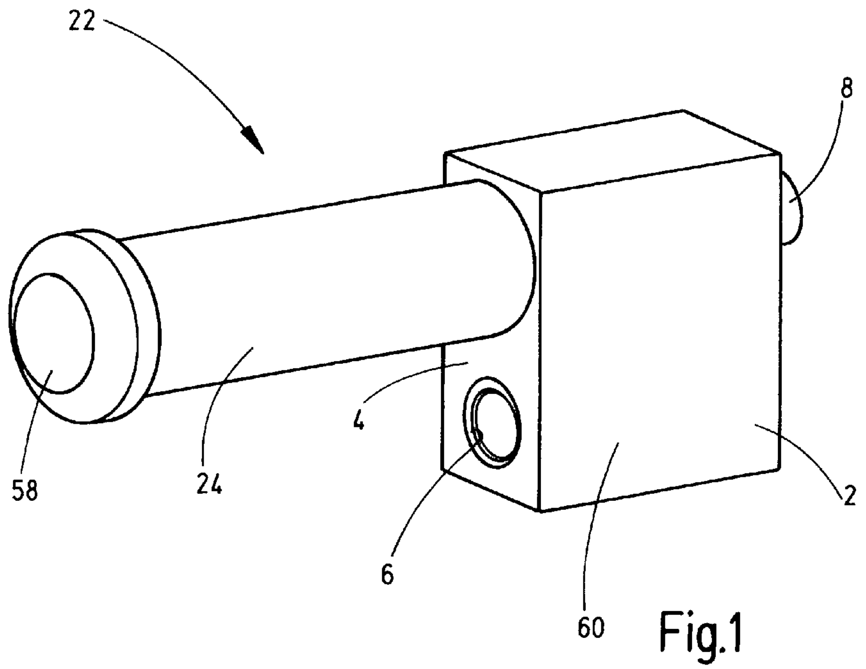
FIG. 1 is a perspective view of a device according to a first exemplary embodiment of the invention.
Figure 2:
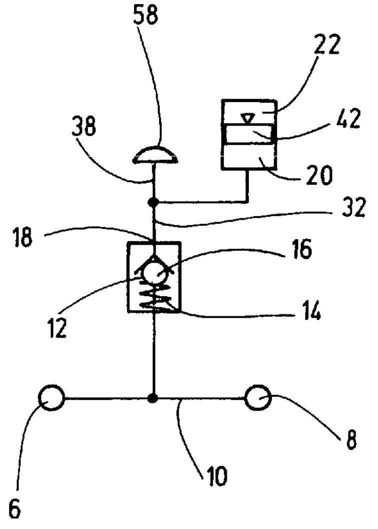
FIG. 2 is a schematic diagram of the hydraulic circuit of the device of FIG. 1.

The first exemplary embodiment of the device according to the invention shown in FIG. 1 has a control block 2 in the form of a rectangular solid with a rectangular end face 4. Located on this end face and on the opposite back side are line couplers 6 and 8, respectively, which are connected to each other inside the control block 2 via a fluid passage 10 (FIG. 2). The device can be connected to the hydraulic system of the not illustrated attachment and to the hydraulic system of the supplying working implement, which is also not illustrated, via the couplers 6 and 8, respectively.

Besides the fluid passage 10, the control block 2 (which forms a valve block) has a non-return valve 12 in FIG. 2. With a closing ball 16 tensioned by a closing spring 14, this non-return valve closes the fluid connection between the fluid passage 10 and a relief outlet 18. A pressure accumulator in the form of a spring accumulator 22 has a fluid side connected to relief outlet 18, which accumulator is illustrated separately in longitudinal section in FIG. 3. The spring accumulator 22 has a circular cylinder-shaped accumulator housing 24, which housing is closed on the end 26 allocated to the control block 2 up to a fluid inlet 28 that leads to the fluid chamber 20 and that is arranged coaxially to the longitudinal housing axis 46. A threaded pin 30, with which the housing 24 is screwed onto the end face 4 of the control block 2, connects to the fluid inlet 28. In the interior of the threaded pin 30, a direct connection 32 is to the relief outlet 18 of the non-return valve 12. The relief outlet 18 transitions directly into the internal connection 32 of the threaded pin 30 such that the valve ball 16 for opening the non-return valve 12 can be accessed by an actuating member via the internal connection 32.

For triggering a relief process, a manually moveable actuating member is provided. The device according to the invention has an actuator rod 38 guided coaxially to the longitudinal housing axis 40 through the accumulator housing 24 in such a way that its actuating end 40 abuts against the valve ball 16 of the non-return valve 12. The actuator rod 38 passes through an accumulator piston 42 bordering the fluid chamber 20, as well as through a closing body 44, which closes the accumulator housing 24 on the end turned away from the fluid chamber 20. The closing body 44 has a tubular extension 48, which extends, concentrically to the axis 46, axially toward the opposite housing end 26 for about ⅔ of the housing length.

The tubular extension 48 forms the guideway or guide for the actuator rod 38. A collar 50 is formed at the passage through the closing body or member 44, which collar in conjunction with a ledge 52 at which the actuator rod 38 transitions into an end section 54 with a narrower diameter, forms an end stop that restricts the outwardly-directed sliding motion of the actuator rod 38 to the position shown in FIG. 3. A helical spring 56, which surrounds the extension 48 and which abuts against the closing body 44 and the accumulator piston 42, tensions the piston during a working motion. During the working motion, the accumulator receives a relief volume for relieving the pressure of the system connected to the couplers 6, 8 when the non-return valve 12 is opened.

Figure 3:
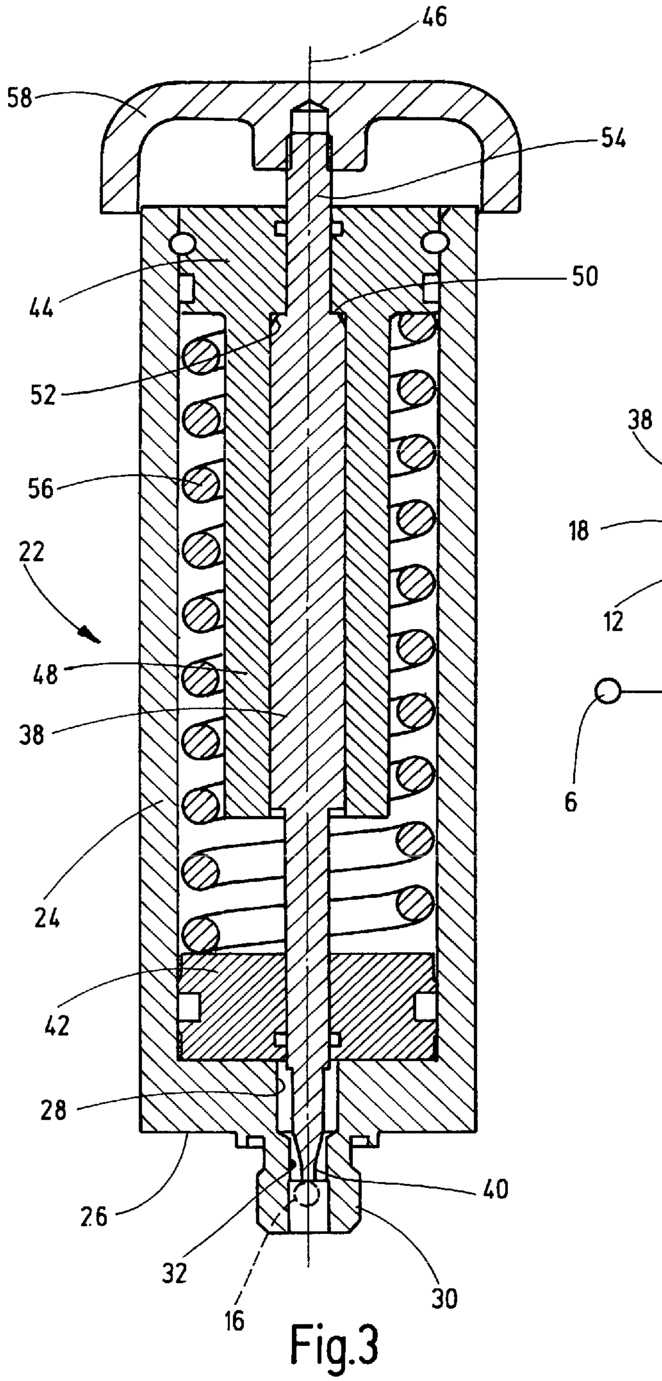
FIG. 3 is a side view in section, drawn to approximately twice the size of a practical embodiment, of the separately illustrated pressure accumulator of the device of FIG. 1.

For carrying out the relief process manually, an actuator button 58 is mounted on the outside end section 54 of the actuator rod 38 and projects above the accumulator housing 24 for sliding the actuator rod 38 in such a way that its actuating end 40 moves the valve ball 16 against the force of the closing spring 14 and opens the non-return valve 12. In FIG. 3, the actuator rod 38 narrows in stepwise fashion in its region where it exits the tubular extension 48. As a result of affixing the stepwise reduction (i.e., the ledge so formed in the actuator rod 38) at a predefined travel distance below the bottom end of the extension 48, as in an embodiment not illustrated in any further detail, the actuator pin will be pressed back against the manual force exerted by the operator due to the projected ledge on the actuator pin shortly before the mechanical end position of the piston against the mechanical spring is reached such that the hydraulic working chamber is closed again. Consequently only the maximum working pressure exertable by manual force and not the maximum system pressure can arise in this chamber. In this manner the maximum design pressure of the pressure relief valve can be reduced considerably, which makes operation easier.

As FIG. 1 shows, the accumulator housing 24 is joined to the valve block 2 to form a single-piece structure, in which the axis 46 of the accumulator housing 24 and thus the actuation axis for triggering the pressure relief aligns with the line coupler 8. Offset relative to the actuation axis toward the plane of the end face 4, the structure with the control block 2 forms a handle 60 on which the coupler 6 offset relative to the actuation axis is located and which can be grasped by the operator for a convenient operation of the device.

Figure 4:
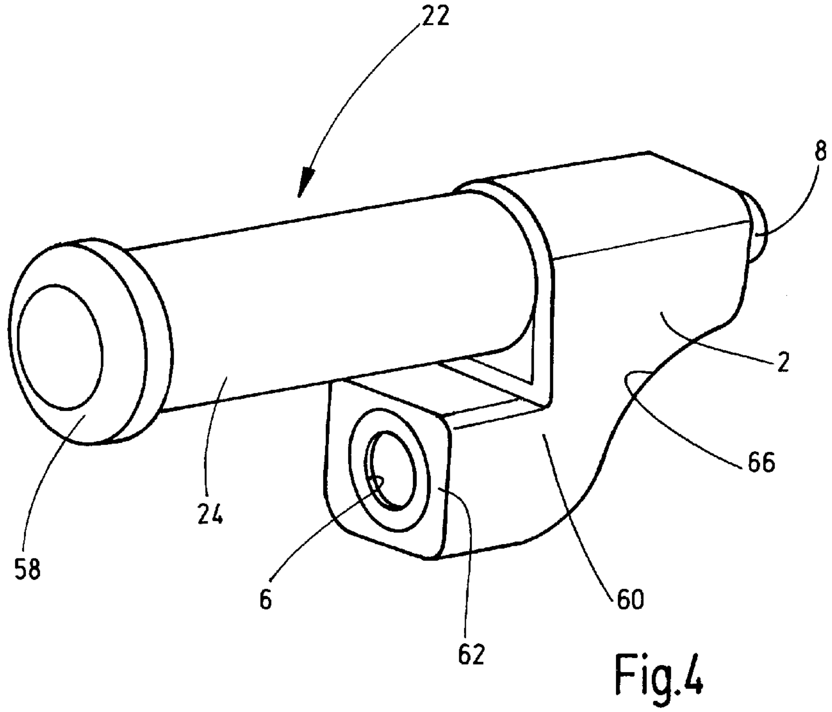
FIG. 4 is a perspective view of a device according to a second exemplary embodiment of the invention.

For a particularly safe and convenient manipulation, in the modified exemplary embodiment shown in FIG. 4, provision is made of a special shape for the handle 60 formed by the control block 2. As FIG. 4 shows, the coupling part 62 next to the actuation axis of the accumulator housing 24 and having the coupler 6 is configured so that it overhangs in the direction of the actuation axis, wherein a connection part 66 is formed between this coupling part 62 and the line coupler 8 lying on the actuation axis, which connecting part extends between the coupling part 62 and the line coupler 8 in a form that is curved. The structure then forms a type of pistol grip so that the device can be conveniently grasped and held by the operator with one hand and the actuator button 58 can be simultaneously pressed with fingers of the same hand.

The spring accumulator 22 has a relatively slight pretensioning generated by the helical spring 56 so that when the non-return valve 12 is open, the pressure in the accumulator 22 is sufficiently lowered so that coupling processes can be carried out easily and safely. In operating phases in which the system in the attachment is unpressurized, as well as when the attachment is no longer being operated, owing to the pretensioning of the spring accumulator 22 the oil volume contained therein is fed back to the system via the non-return valve 12. This work cycle can take place repeatedly.

While various embodiments have been chosen to illustrate the invention, it will be understood by those skilled in the art that various changes and modifications can be made therein without departing from the scope of the invention as defined in the claims.

The invention claimed is:

1. A device for relieving pressure in hydraulic lines of attachments having hydraulically actuatable actuators and working implements, the device comprising:

a control block with a first line coupler connectable to a hydraulic line to be relieved of pressure therein;

an openable non-return valve in said control block operable as a pressure relief valve, said non-return valve having a movable closing body;

a pressure accumulator in said control block and having a relief volume in an accumulator housing configured to hold fluid from said first line coupler when said non-return valve is open to provide fluid communication between said first line coupler and said relief volume, said pressure accumulator having an axially movable accumulator piston in said accumulator housing, said closing body and said accumulator piston being independently movable; and a manually movable actuating member coupled to said non-return valve and movable in said accumulator housing to open said non-return valve.

2. A device according to claim 1 wherein said accumulator housing extends along a longitudinal axis with said accumulator piston being movable in said accumulator housing along said longitudinal axis; and said actuating member comprises an actuator rod guided coaxially through said accumulator housing to said closing body of said non-return valve, said closing body being movable by said actuator rod to an open position thereof against a biasing force biasing said closing body toward a closed position thereof.

3. A device according to claim 2 wherein an actuator button is mounted on the outer end of said actuator rod, projects beyond an outer surface of said control block and is configured to manually move said actuating rod.

4. A device according to claim 2 wherein said pressure accumulator comprises a spring accumulator with said accumulator piston being tensioned on a side thereof facing away from a fluid chamber forming said relief volume by a pressure spring; and said actuator rod extends through said pressure spring with an inside end of said actuator rod extending through a fluid inlet of said accumulator housing to said closing body of said non-return valve.

5. A device according to claim 2 wherein said accumulator housing is closed on an end thereof remote from said relief volume by a closing member having a tubular extension extending therefrom; and a pressure spring in said accumulator housing abuts said closing member and biases said accumulator piston, said tubular extension extending axially within said pressure spring, said actuator rod extending in and being guided for axial movement in said closing member and said tubular extension.

6. A device according to claim 1 wherein said accumulator housing and said control block are joined forming a structure with a direct connection of a fluid chamber forming said relief volume to a relief outlet of said non-return valve.

7. A device according to claim 1 wherein said control block and said accumulator housing form a handle structure positioned next to an actuator axis along which said actuating member moves in said accumulator housing.

8. A device according to claim 7 wherein said handle structure forms a connection part between a first connection part having said first line coupler extending overhangingly next to said accumulator housing extending along said actuation axis, and forms a second line coupler positioned on said actuation axis; and said connection part extends along a curve between said first connection part and said second line coupler.

9. A device for relieving pressure in hydraulic lines of attachments having hydraulically actuatable actuators and working implements, the device comprising:

a control block with a first line coupler connectable to a hydraulic line to be relieved of pressure therein;

an openable non-return valve in said control block operable as a pressure relief valve, said non-return valve having a movable closing body;

a pressure accumulator in said control block and having a relief volume in an accumulator housing configured to hold fluid from said first line coupler when said non-return valve is open to provide fluid communication between said first line coupler and said relief volume, said accumulator housing extending along a longitudinal axis, said pressure accumulator having an axially movable accumulator piston in said accumulator housing;

a manually movable actuating member coupled to said non-return valve and movable in said accumulator housing to open said non-return valve, said actuating member including an actuator rod guided for movement coaxially through said accumulator housing to said closing body of said non-return valve, said closing body being movable by said actuator rod against a closing force on said closing body from a closed position to an open position of said closing body, said actuator rod extending through said accumulator piston.

10. A device according to claim 9 wherein
an actuator button is mounted on the outer end of said actuator rod, projects beyond an outer surface of said control block and is configured to manually move said actuating rod.

11. A device according to claim 9 wherein
said accumulator housing and said control block are joined forming a structure with a direct connection of a fluid chamber forming said relief volume to a relief outlet of said non-return valve.

12. A device according to claim 9 wherein
said pressure accumulator comprises a spring accumulator with said accumulator piston being tensioned on a side thereof facing away from a fluid chamber forming said relief volume by a pressure spring; and
said actuator rod extends through said pressure spring with an inside end of said actuator rod extending through a fluid inlet of said accumulator housing to said closing body of said non-return valve.

13. A device according to claim 9 wherein
said control block and said accumulator housing form a handle structure positioned next to an actuator axis along which said actuating member moves in said accumulator housing.

14. A device according to claim 13 wherein
said handle structure forms a connection part between a first connection part having said first line coupler extending overhangingly next to said accumulator housing extending along said actuation axis, and forms a second line coupler positioned on said actuation axis; and
said connection part extends along a curve between said first connection part and said second line coupler.

15. A device according to claim 9 wherein
said accumulator housing is closed on an end thereof remote from said relief volume by a closing member having a tubular extension extending therefrom; and
a pressure spring in said accumulator housing abuts said closing member and biases said accumulator piston, said tubular extension extending axially within said pressure spring, said actuator rod extending in and being guided for axial movement in said closing member and said tubular extension.

16. A device for relieving pressure in hydraulic lines of attachments having hydraulically actuatable actuators and working implements, the device comprising:
a control block with a first line coupler connectable to a hydraulic line to be relieved of pressure therein;
an openable non-return valve in said control block operable as a pressure relief valve, said non-return valve having a movable closing body;
a pressure accumulator in said control block and having a relief volume in an accumulator housing configured to hold fluid from said first line coupler when said non-return valve is open to provide fluid communication between said first line coupler and said relief volume, said accumulator housing extending along a longitudinal axis;
a manually movable actuating member coupled to said non-return valve and movable in said accumulator housing to open said non-return valve, said actuating member including an actuator rod guided for coaxial movement through said accumulator housing to said closing body of said non-return valve, said closing body being movable by said actuator rod against a closing force on said closing body from a closed position to an open position of said closing body; and
an actuator button being mounted on an outer end of said actuator rod, projecting beyond an outer surface of said control block and being configured to manually move said actuating rod in said accumulator housing.

17. A device according to claim 16 wherein
said accumulator housing and said control block are joined forming a structure with a direct connection of a fluid chamber forming said relief volume to a relief outlet of said non-return valve.

18. A device according to claim 16 wherein
said pressure accumulator comprises a spring accumulator with said accumulator piston being tensioned on a side thereof facing away from a fluid chamber forming said relief volume by a pressure spring; and
said actuator rod extends through said pressure spring with an inside end of said actuator rod extending through a fluid inlet of said accumulator housing to said closing body of said non-return valve.

19. A device according to claim 16 wherein
said control block and said accumulator housing form a handle structure positioned next to an actuator axis along which said actuating member moves in said accumulator housing.

20. A device according to claim 19 wherein
said handle structure forms a connection part between a first connection part having said first line coupler extending overhangingly next to said accumulator housing extending along said actuation axis, and forms a second line coupler positioned on said actuation axis; and
said connection part extends along a curve between said first connection part and said second line coupler.

21. A device according to claim 16 wherein
an axially movable piston is in said accumulator housing;
said accumulator housing is closed on an end thereof remote from said relief volume by a closing member having a tubular extension extending therefrom; and
a pressure spring in said accumulator housing abuts said closing member and biases said accumulator piston, said tubular extension extending axially within said pressure spring, said actuator rod extending in and being guided for axial movement in said closing member and said tubular extension.

* * * * *